(12) United States Patent
Chesla et al.

(10) Patent No.: US 12,513,172 B2
(45) Date of Patent: Dec. 30, 2025

(54) SYSTEMS AND METHODS FOR IDENTITY MANAGEMENT

(71) Applicant: Cybereason Inc., Boston, MA (US)

(72) Inventors: Avi Chesla, Tel Aviv (IL); Sivan Omer, Tel Aviv (IL)

(73) Assignee: Cybereason Inc., Boston, MA (US)

( * ) Notice: Subject to any disclaimer, the term of this patent is extended or adjusted under 35 U.S.C. 154(b) by 281 days.

(21) Appl. No.: 18/194,181

(22) Filed: Mar. 31, 2023

(65) Prior Publication Data

US 2023/0319088 A1 Oct. 5, 2023

Related U.S. Application Data

(60) Provisional application No. 63/362,271, filed on Mar. 31, 2022.

(51) Int. Cl.
*H04L 9/40* (2022.01)

(52) U.S. Cl.
CPC ...... *H04L 63/1425* (2013.01); *H04L 63/1416* (2013.01); *H04L 63/1433* (2013.01)

(58) Field of Classification Search
CPC ............. H04L 63/1425; H04L 63/1416; H04L 63/1433
See application file for complete search history.

(56) References Cited

U.S. PATENT DOCUMENTS

| | | | |
|---|---|---|---|
| 12,086,808 B1* | 9/2024 | Shahidzadeh | G06Q 20/425 |
| 12,095,794 B1* | 9/2024 | Karaje | H04L 67/306 |
| 12,095,796 B1* | 9/2024 | Godefroid | G06F 9/542 |
| 12,099,492 B1* | 9/2024 | Bagga | H04L 67/146 |
| 12,126,643 B1* | 10/2024 | Skarphedinsson | H04L 63/1441 |
| 12,130,878 B1* | 10/2024 | Nanduri | H04L 63/10 |
| 2002/0083343 A1* | 6/2002 | Crosbie | G06F 21/552 709/224 |
| 2017/0344318 A1* | 11/2017 | Kawasaki | G06F 21/608 |
| 2020/0004957 A1* | 1/2020 | Chamaraju | G06N 20/00 |
| 2020/0336508 A1* | 10/2020 | Srivastava | H04L 63/20 |
| 2021/0084071 A1* | 3/2021 | Mandrychenko | H04L 63/1483 |
| 2022/0400130 A1* | 12/2022 | Kapoor | H04L 63/10 |
| 2023/0239313 A1* | 7/2023 | Peters | H04L 63/1425 726/22 |
| 2023/0254330 A1* | 8/2023 | Singh | G06F 11/323 726/23 |
| 2024/0273158 A1* | 8/2024 | Kol | G06F 16/9566 |
| 2024/0314169 A1* | 9/2024 | Azad | H04L 63/1491 |
| 2024/0356986 A1* | 10/2024 | Crabtree | G06F 16/2477 |
| 2024/0430328 A1* | 12/2024 | Robinson | H04L 67/535 |
| 2025/0016202 A1* | 1/2025 | Crabtree | G06F 16/2477 |

\* cited by examiner

*Primary Examiner* — Stephen T Gundry
(74) *Attorney, Agent, or Firm* — DLA Piper LLP (US)

(57) ABSTRACT

Disclosed is a computer-implemented method for correlating user information can include receiving, from a user device, a login log associated with a user; receiving an intrusion detection system (IDS) log; receiving a domain name system (DNS) log; receiving, from a computing device, a log; enriching at least one of the login log, the IDS log, or the DNS log; and correlating an identity with one or more of the login log, the IDS log, and the DNS log. In some embodiments, correlating the identity with one or more of the login log, the IDS log, and the DNS log can include generating a graph representation and saving the graph representation as a sparse graph representation.

18 Claims, 9 Drawing Sheets

SYSTEMS AND METHODS FOR IDENTITY MANAGEMENT

CROSS-REFERENCE TO RELATED APPLICATIONS

This application claims priority to U.S. Provisional Application No. 63/362,271, filed Mar. 31, 2022, which is herein incorporated by reference in its entirety.

BACKGROUND OF THE DISCLOSURE

In some applications, it is desirable to be able to link a user across systems. This can be done to detect when a user is under attack across multiple attack surfaces or to detect when an attacker is using multiple accounts to attack. The same user might have different names/logins/accounts for different services and might not be using the same identity.

SUMMARY OF THE DISCLOSURE

According to one aspect of the present disclosure, a computer-implemented method for correlating user information can include receiving, from a user device, a login log associated with a user; receiving an intrusion detection system (IDS) log; receiving a domain name system (DNS) log; receiving, from a computing device, a log; enriching at least one of the login log, the IDS log, or the DNS log; and correlating an identity with one or more of the login log, the IDS log, and the DNS log. In some embodiments, correlating the identity with one or more of the login log, the IDS log, and the DNS log can include generating a graph representation and saving the graph representation as a sparse graph representation.

In some embodiments, receiving the login log can include receiving at least one of a username and an internet protocol (IP) address. In some embodiments, receiving the IDS log can include receiving at least one of an IP address and a hostname. In some embodiments, the IP address is a first IP address and receiving the DNS log comprises receiving the hostname and a second IP address. In some embodiments, receiving the log can include receiving at least one of an email address and the username. In some embodiments, enriching at least one of the login log, the IDS log, or the DNS log can include enriching the IDS log with the username. In some embodiments, enriching at least one of the login log, the IDS log, or the DNS log can include enriching the application log with the hostname, the first IP address, and the second IP address. In some embodiments, the method can include receiving at least one of keystroke information, ad analysis information, and browser fingerprinting information; and correlating the at least one of keystroke information, ad network information, and browser fingerprinting information with the identity. In some embodiments, the graph representation can include a plurality of nodes, wherein each node is associated with one of the identity, the first IP address, the second IP address, the username, the hostname, and the email address.

According to another aspect of the present disclosure, a computer-implemented method for correlating user information can include receiving, from a user device, a login log associated with a user; receiving an intrusion detection system (IDS) log; receiving a domain name system (DNS) log; receiving, from the user device, an application log; enriching at least one of the login log, the IDS log, or the DNS log; receiving a second DNS log; and correlating an identity with one or more of the login log, the IDS log, and the DNS log. In some embodiments, correlating the identity with one or more of the login log, the IDS log, and the DNS log can include generating a graph representation and saving the graph representation as a sparse graph representation.

In some embodiments, receiving the login log can include receiving at least one of a username and an internet protocol (IP) address. In some embodiments, receiving the IDS log can include receiving at least one of an IP address and a hostname. In some embodiments, the IP address is a first IP address and receiving the DNS log comprises receiving the hostname and a second IP address. In some embodiments, receiving the application log can include receiving at least one of an email address and the username. In some embodiments, wherein enriching at least one of the login log, the IDS log, or the DNS log can include enriching the IDS log with the username. In some embodiments, enriching at least one of the login log, the IDS log, or the DNS log can include enriching the application log with the hostname, the first IP address, and the second IP address. In some embodiments, the method can include receiving at least one of keystroke information, ad network information, and browser fingerprinting information; and correlating the at least one of keystroke information, ad analysis information, and browser fingerprinting information with the identity. In some embodiments, receiving the second DNS log can include receiving a second hostname and the second IP address.

DESCRIPTION

Figure 1:
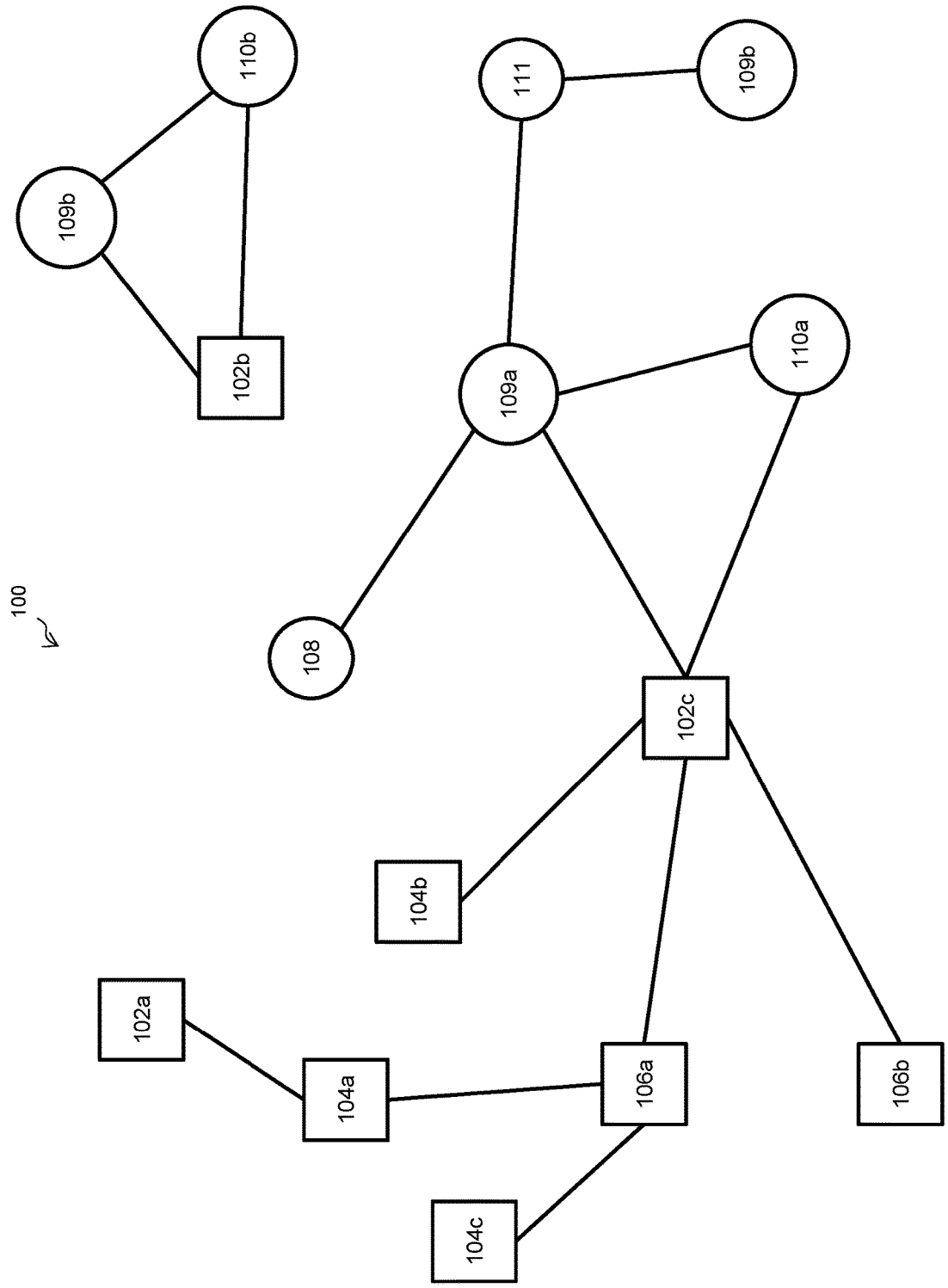
FIG. 1 is a graph model according to some embodiments of the present disclosure.

The following detailed description is merely exemplary in nature and is not intended to limit the invention or the applications of its use.

Embodiments of the present disclosure relate to systems and methods for identity management and representing an entity via a graph model. IDM (Identity management) proposes to allow managing connections between different identity properties such as username, account id, hostname, IP address, email address, email distribution list, and more. The purpose is to allow better investigation of user experience and better automatic attack detection. The ability to enrich logs with additional identity properties allows the identification of broader correlations between events based on the same identity and even allows a security analyst to get more organizational context while analyzing Extended Detection and Response (XDR) detection. For example the analyst can simply search for information about all identities associated with a user and thus clarify the organization structure. In another example, two events with different IP addresses are usually not connected, but if it is known that those addresses were used by the same host, it might be related to the same attack. In this case, enriching IP addresses with the host will enable the identification of events with different identity properties related to the same identity.

In some cases detecting attacks against an entity (e.g., a user) requires collecting evidence from various systems in an associated network, such as logs from systems like network devices (switches and routers), network security products (firewalls, web and email proxy/relays), endpoint (OS logs, EDR and EPP), identity management application, cloud workspace application, IOT devices, and the like.

Each piece of evidence might represent a single step within an attack which might not be a clear indication for flagging the activity as malicious. In addition to that, each evidence can include different representative identity information of the victim or the performer, or both. Therefore, the ability of linking the various identities to a user (either the performer or the victim or both), would enable better investigation and detection of multi stage attacks.

In some other cases the ability to link a user to its identities provides the capability to execute response actions across different security controls and environments, where each security control/environment requires different identity parameters to execute the response.

For example, executing response actions via network devices (e.g., blocking a traffic flow based on the IP address identity that is currently associated with a compromised user), response actions via identity management system (e.g., disabling a user account which requires the user account ID), response action via email systems (e.g., disabling an email account, deleting messages of a compromised email account, blocking a sender that was detected as malicious and others, all which typically require knowing the email account(s) of the user), response action via cloud workspace applications (e.g., blocking file upload for a specific user account in Office 365® or in Google® Work Space etc., which requires linking the various user accounts to the subject user).

Today's security systems address the challenge of linking identities via a manual process which consumes too much time from the user (e.g., the security analyst) and increases the overall mean time to detect (MTTD) and mean time to identify (MTTI) cyberattacks. This often leaves the organization vulnerable.

IDM (Identity management) proposes linking the same user behind different identity properties such as username, account ID, hostname, IP address, email address, email distribution list, and more. This enables better investigation experience and improved attack detections.

The ability to enrich logs collected from all network environments with additional identity properties allows the identification of broader correlations between events based on the same identity. Logs can be collected from security products, network devices, end points, IOT devices, cloud applications, and more.

For example, two events with different IP addresses are usually not connected, but if it is known that those addresses were used by the same host (in different times or if the host has multiple interfaces) then it might be related to the same attack. In this case, enriching IP addresses with the host can enable the identification of events with different identity properties related to the same identity.

Organizations today use dozens of network, IT, and security solutions to support their operational and business needs. Every data source might include in its logs different properties that describe the asset involved. For example, email security tools would include the email address, and cloud workspace will include the account ID or account name. Even when both the email address and the account id actually belong to the same person within the organization, these properties might differ.

Organizations with thousands of employees and dozens to hundreds of different systems that are deployed in different network environments are struggling with cross-data source investigation and detection and therefore need a way to simplify the process by overcoming the difficulty of linking identities.

An IDM (identity management) solution would overcome challenges of identity correlation/linking and thus will improve cyber-attack detection and investigations.

The following are various capabilities of the disclosed systems and methods: (1) the IDM service creates an abstract representation of relationships between identities; (2) the IDM allows identifying events associated with specific identities that might represent the same person (user employee), machine (laptop, desktop, mobile device), user account (AD user account, Cloud application account) etc.; (3) the IDM learns identities and relationships based on evidence logs that is collected from the IT stack, from systems such as domain name system (DNS), DHCP, AD (either deployed on-prem, in the cloud or in both), network and endpoint security logs, OS logs, Identity & Access Management systems, MDM systems and others; (4) relationships between identities are typically maintained in the form of a graph, where graph enrichment methods are applied, which work on the collected data; (5) the IDM's data is utilized by security analytics systems so they can analyze data more effectively, enabling increased attack detection coverage and improved time to investigate, and in general providing a more accurate result (lower false positives, higher true positives); (6) events collected from various data sources in the network with partial identity information may be enriched with additional identity information via the IDM service. e.g., if the log contains just the IP address or hostname, then the IDM service can add the associated user account who is the owner of that host and that uses the IP address). This is done in order for a security analytics system to be able to correlate events that are associated with the same user identity and thus detect potential malicious operations based on multiple events, which some can be considered as "weak" signals (suspicious activities) and some as benign events, but only when clustering them together based on the common user identity information the attack can be identified.

Various identity types can be used: (1) machine—the name of a network machine, can be a computer, server, website, or other device connected to some network, either the organization's internal network or external public network. FQDN— machine fully qualified domain name (e.g., "SIV-LT.cybereason.net"). Non FQDN— machine prefix or name includes partial domain (e.g., "SIV-LT" or "SIV-LT.cybereason"). (2) IP Address—An Internet Protocol address is a numerical label assigned to each device connected to a computer network. A specific machine can use multiple IP addresses while moving between different networks (home, office, etc.), or staying in the same office network but switching from cable to Wi-Fi for instance. IP addresses can be repeated between different networks in the same customer environment. Each IP is typically coupled with its network. (3) MAC Address—a media access control address (MAC address) is a unique identifier assigned to a network interface controller (NIC) for use as a network address in communications within a network segment. (4) User Identity— A user is a person who utilizes accounts, computers, servers, apps, or network services. User Full Name—a full name of a person (e.g., John Cohen Sivan Omer). (5) User Account—Name (none FQDN)— account prefix or partial name, the name not including the full domain "sivan.omer" or "sivan.omer@cybereason." FQDN username—user fully qualified domain name (e.g. "sivan.omer@cybereason.com" or "cybereaso.com\sivan.omer"). Account type—domain account, cloud account, default account. Account ID— a unique identifier for an account within a given tool/platform. Each user account will have its own ID, few examples: AD SID: S-1-5-21-1180699209-877415012-3182924384-1004, Azure AD/Office 365® ID: c459abc8-31c6-495d-aebf-9d98c86f0c8d, and AWS ID: 858847746414. (6) Email Address—there are 2 types of emails: personal address (including aliases) and distribution list (e.g., RND@cybereason.com). (7) Group—group is a container that holds multiple users or multiple emails.

FIG. 1 is a graph model 100, according to some embodiments of the present disclosure. Hosts and user information are presented as a graph. The graph 100 includes various hosts 102a-c, IP addresses 104a-c, MAC addresses 106a-b, an email address 108, usernames 109a-b, and security identifiers (SIDs) 110a-b. The lines can represent the edges connecting each component in the graph model 100. Each edge in the graph connecting the two identities in the evidence can represent evidence. Evidence containing n identities creates (n!)/2 edges. In some embodiments, these edges are assigned lower proportional to the number of edges. Each edge can contain the following information: time, source (where the evidence came from), and release time (if available, from "negative" evidence—see below evidence types). Both username 109 and host name 102 may be partial. The domain or part of it may not be appear. Evidence with partial names may be treated as the same weight as other evidence. In some embodiments, this can be treated with lower weight. For example, in some embodiments the weight is proportional to the number of possible valid completions. "Fuzzy identities"-methods of detecting different identities values that represent the same entity, e.g., two account names that represent the same user, may be realized by using embedded heuristics rules, linguistic analysis methods, as well as end user inputs to the system (e.g., the system's operator may define that a certain user account name represents the same user that is represented by another user account name). In some embodiments, the graph may be saved as a sparse graph representation.

Figure 2:
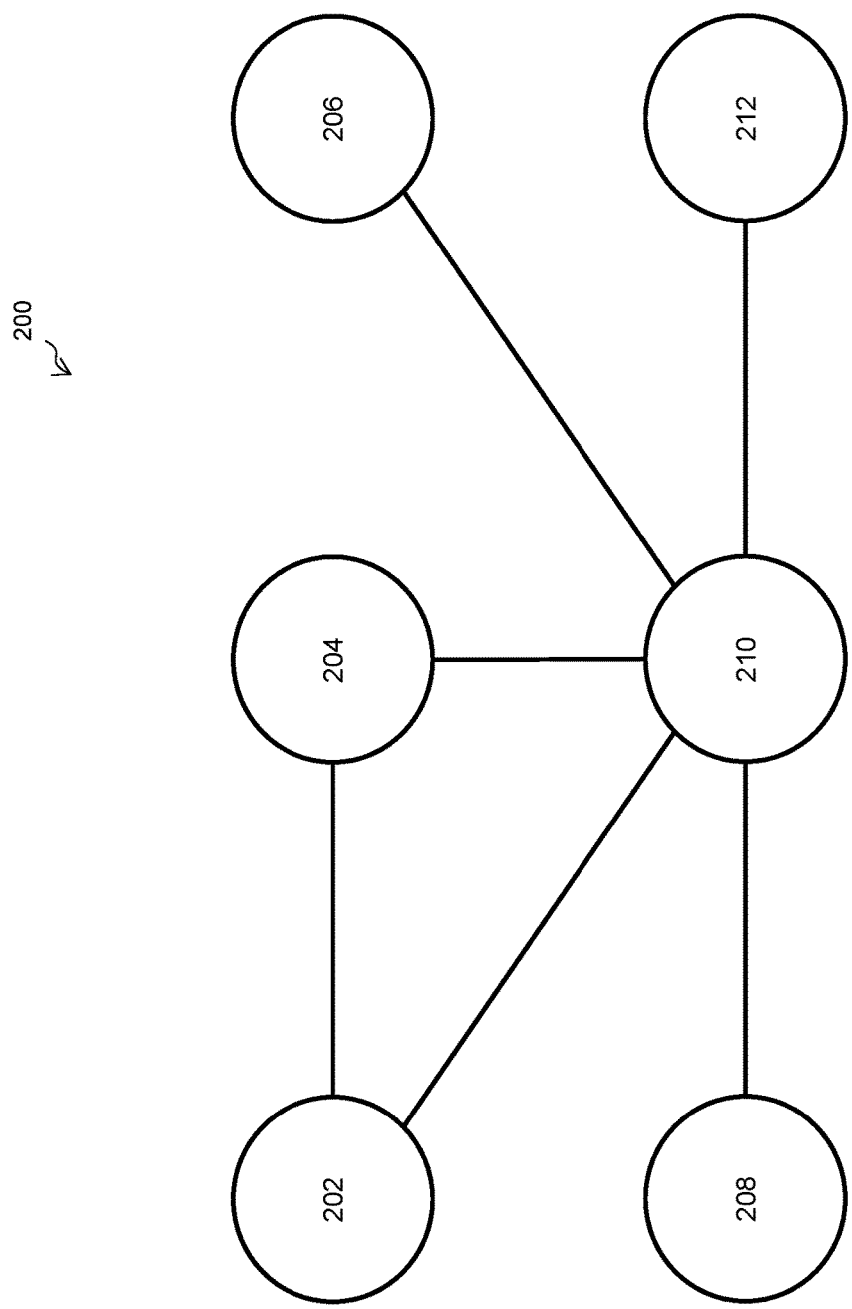
FIG. 2 is an example graph identity model according to some embodiments of the present disclosure.

FIG. 2 is an example graph identity model 200. The graph model 200 includes a machine 202, an IP address 204, a group 206, a user identity 208, a user account 210, and an email address 212. The lines can represent the edges connecting each component. With reference to above, the "user identity" represents an abstract representation of a user that has multiple user accounts, such as in a 1:n relationship. In some embodiments, the linkage can be done using other methods. For example, access times, typing patterns, dwell time, latency, similarities in program usage, similarities in language usage or any property which is present in different proportions in different segments of the population.

There are several types of telemetry that provide identity management for the IDM system. These types are described below: Evidence can include Information that is collected from external source(s) and contain correlation between two or more types of identities. Examples can be a log containing both username and host name, a DNS response containing Host name and IP address, or a DHCP acknowledge containing MAC and IP addresses. Negative evidence can include information that is collected, e.g., from external sources which reduces the correlation between two or more types of identities. This can be definitive evidence that two accounts are not linked or merely suggestive of a lower probability of linkage. Examples can include Windows logout, DHCP release, use of two different IP addresses at the same time, or being linked to a different account of the same type. Implicit Negative evidence can be based on the evidence and the identity model. Examples can include if a new evidence connecting MAC to IP is arrived or an old correlation between this MAC and another IP is no longer valid.

Below is a non-exhaustive list of common evidence types, their associated data sources and type of relationships that can be learned from them:
 a. DNS
    IP— Host name
 b. DHCP Acknowledge
    Discover: MAC-IP
 c. DHCP Release
    Release: MAC-IP (defined as negative evidence, i.e., break a relationship)
 d. AD/DC success login:
    Username—hostname-IP— sid
 e. AD/DC logout (negative evidence):
    Username—hostname-IP
 f. Network security logs (intrusion detection system (IDS), FW, DLP, . . . ):
    IP— hostname— (username)
 g. EDR, AV, and other endpoint telemetry sources:
    MAC-hostname-IP-username (machine owner, logged in user)
 h. Identity systems (e.g., Okta user context, MDM,)
    User to email(s) addresses, Users' group, etc.

A few examples of identity correlation decision making methods are described (i.e., decision to link IDM graph nodes). Identity correlation decisions can be done by looking at co-occurrences over time. e.g., two identities are typically accessed at similar times (within a fixed bound) from the same IP address. Identity correlation decisions can be done by looking at occurrences over time per same host. e.g., same user will typically use the same machine/host (e.g., personal laptop, mobile etc.) that log into multiple applications (e.g., Office 365®, Amazon® Web Services, etc.) using different account names—all these user accounts can be linked to the same user. It is important to note that this method can be achieved also by the Adversary by using attack tools such as keylogger and in general by utilizing "input capture" hack tools that can retrieve identity related information from the endpoint and that can be shared via C2 channels. Identity correlation decisions can be done by using device fingerprinting (see e.g., https://en.wikipedia.org/wiki/Device_fingerprint for an overview). Identity correlation decisions can be done based on telemetry that represent access to 3rd party application and services (e.g., Office 365®, AWS services, etc.) from a host. Identity correlation decisions can be done by any method used by ad networks. This includes cookies, universal ID (https://headerbidding.co/universal-id-adtech/). By linking the same user on multiple systems, the user can also be linked. Identity correlation decisions can be done by users who have profile pictures where the same person appears in more than one account. Identity correlation decisions can be done by multiple methods each of which has a low confidence level. For example, utilizing similarities in properties such as name, time accessed, language. latency, paths of communication (e.g., for emails), dwell time, time of day accessed etc. In some embodiments, evidence can first be filtered through a program to detect impersonations, such as those offered by Eydle.com.

Figure 3:
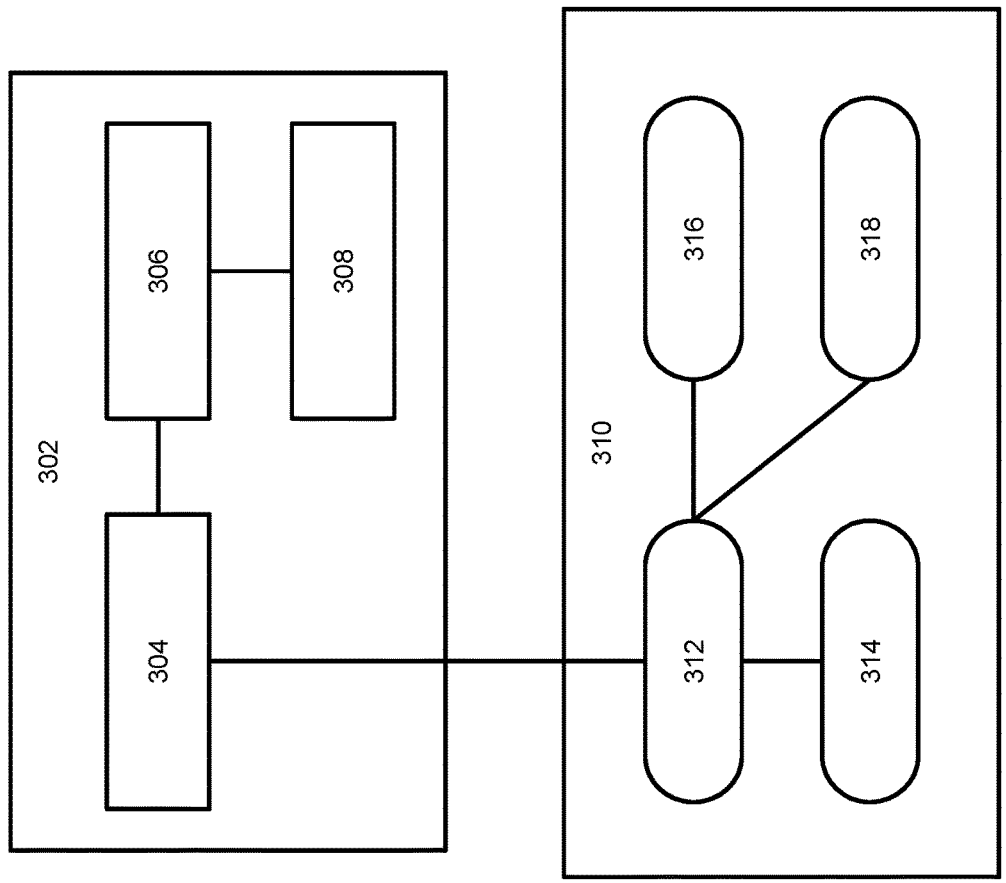
FIG. 3 shows another example of an identity graph model with specific identity details according to some embodiments of the present disclosure.

FIG. 3 shows another example of an identity graph model 300 with specific identity details. The graph model 300 includes a host 302 and a user 310. The host 302 includes a hostname 304, a MAC address 306, and an IP address 308. The user 310 includes a username 312, a display name 314, an email 316, and an SID 318. In some embodiments, the host 302 may have multiple MAC addresses 306. In some embodiments, a user 310 may be logged in to multiple hosts, and multiple users could be logged into the host 302.

Figure 4A:
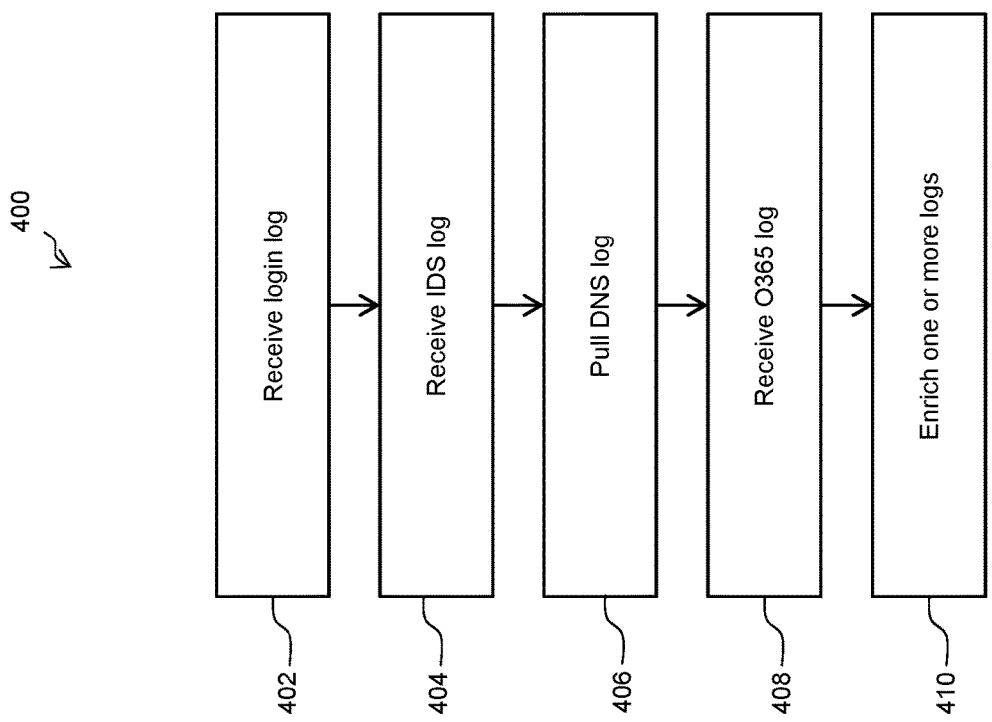
FIG. 4A shows an example identity graph learning process according to some embodiments of the present disclosure.

FIG. 4A shows an example identity graph learning process 400. In some embodiments, process 400 can be performed by a server or other computing device/endpoint. At block 402, the computing device receives a login log. In some embodiments, receiving the login log can include receiving one or more of a username and an IP address. At block 404, the computing device receives an IDS log. In some embodiments, receiving the IDS log can include receiving an IP address and a hostname. At block 406, the computing device pulls a DNS log from a server. In some embodiments, pulling the DNS log can include pulling a DNS log containing the hostname received at block 404 and a second IP address. At block 408, the computing device receives a log (can be referred to as a computing log or a log file), such as an Office 365® log. In some embodiments, the log can contain an email address and the username received at block 402. At block 410, the computing device can enrich one or more of the received logs. For example, in some embodiments, the computing device can enrich the IDS log with the username. In some embodiments, the computing device can enrich the log with the host name, the first IP address, and the second IP address. In some embodiments, after process 400 is performed, the various information can be correlated with a user identity. For example, the information can be correlated in a graph representation (e.g., a sparse graph representation) where nodes correspond to the different entities (i.e., logs, usernames, IP addresses, etc.) and the edges connecting them represent their correlation. In some embodiments, at least one of keystroke information, ad network information, and browser fingerprinting information can be obtained and correlated with the identity. In addition, various information associated with an identity can be obtained by trawling the internet.

Figure 4B:
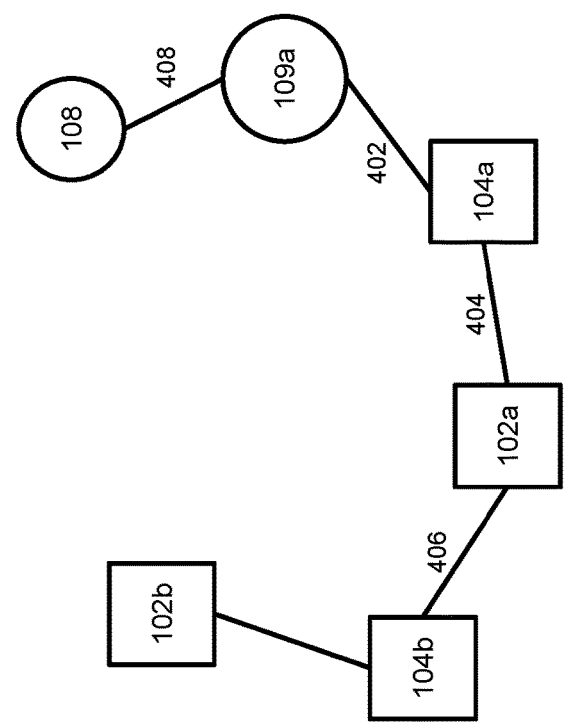
FIG. 4B shows a graph version of the components discussed in relation to FIG. 4A according to some embodiments of the present disclosure.

FIG. 4B shows a graph version of the components discussed in relation to process 400, including a host 102b, an IP address 104b, a host 102a, an IP address 104a, a username 109a, and an email address 108. Block 402 can involve the login log between the username 109a and the IP address 104a. Block 404, can involve the IDS log between the IP address 104a and the host 102a. Block 406 can involve the DNS log between the host 102a and the IP address 104b. Finally, block 408 can involve the log between the username 109a and the email address 108.

Figure 5B:
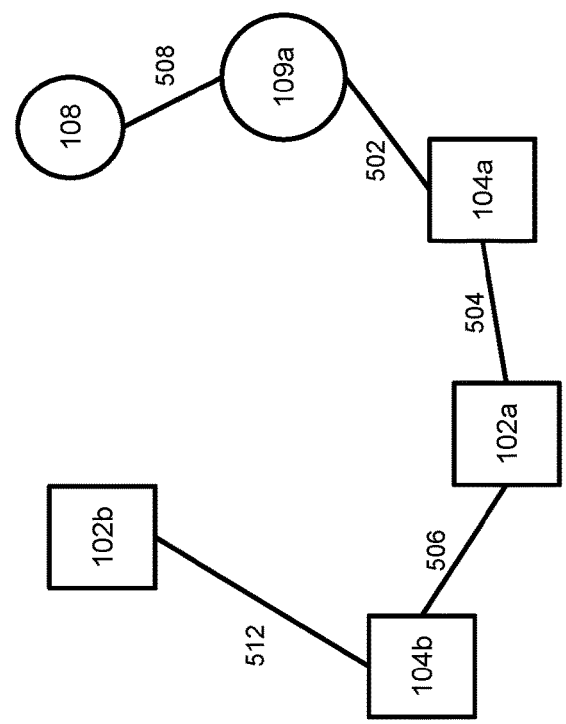
FIG. 5B shows a graph version of the components discussed in relation to FIG. 5A, according to some embodiments of the present disclosure.
Figure 5A:
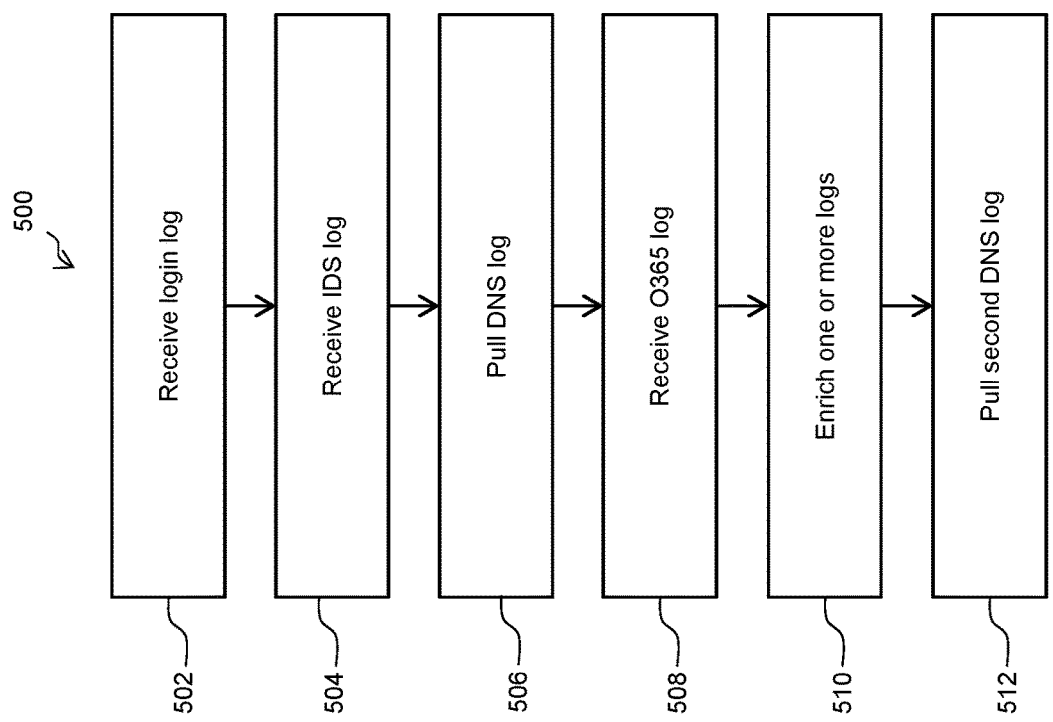
FIG. 5A shows an example process, which can be a tear down process or process for analyzing negative evidence according to some embodiments of the present disclosure.

FIG. 5A shows an example process 500, which can be a tear down process or process for analyzing negative evidence. At block 502, the computing device receives a login log. In some embodiments, receiving the login log can include receiving one or more of a username and an IP address. At block 504, the computing device receives an IDS log. In some embodiments, receiving the IDS log can include receiving an IP address and a hostname. At block 506, the computing device pulls a DNS log from a server. In some embodiments, pulling the DNS log can include pulling a DNS log containing the hostname received at block 504 and a second IP address. At block 508, the computing device receives a log, such as an Office 365® log. In some embodiments, the log can contain an email address and the username received at block 502. At block 510, the computing device can enrich one or more of the received logs. For example, in some embodiments, the computing device can enrich the IDS log with the username. In some embodiments, the computing device can enrich the log with the host name, the first IP address, and the second IP address. At block 512, the computing device pulls a second DNS log. In some embodiments, the second DNS log can include a second hostname and the second IP address. In some embodiments, after process 500 is performed, the various information can be correlated with a user identity. For example, the information can be correlated in a graph representation (e.g., a sparse graph representation) where nodes correspond to the different entities (i.e., logs, usernames, IP addresses, etc.) and the edges connecting them represent their correlation. In some embodiments, at least one of keystroke information, ad network information, and browser fingerprinting information can be obtained and correlated with the identity. In addition, various information associated with an identity can be obtained by trawling the internet.

FIG. 5B shows a graph version of the components discussed in relation to process 500, including a host 102b, an IP address 104b, a host 102a, an IP address 104a, a username 109a, and an email address 108. Block 502 can involve the login log between the username 109a and the IP address 104a. Block 504, can involve the IDS log between the IP address 104a and the host 102a. Block 506 can involve the DNS log between the host 102a and the IP address 104b. Block 508 can involve the log between the username 109a and the email address 108. Finally, block 512 can involve the second DNS log between the host 102b and the IP address 104b.

Events collected from various data sources in the network with partial identity information may be enriched with additional ones by the IDM service. This is done to allow a security analytics system to correlate events that are associated with the same user identity, and thus detect potential malicious operations based on multiple events. This is especially useful when some can be considered as "weak" signals (suspicious activities) and some as benign events— BUT no event by itself necessarily represents a strong and definitive security alert. Identity enrichment can be done actively, during event process time, or post processing (on demand) by querying the IDM service and enriching the event with identity info when needed. The selected method depends on the nature of the detection system and the type of threat that needs to be detected. In some embodiments, enrichment can be performed over time. The same information (e.g., same IP address) can become more significant if it, for example, correlates across multiple sessions.

There are a few possible methods to utilize the IDM's data by any security analytics system. Identity enrichment decision is done by finding the most recent path from one identity to another, in this case the certainty of the correlation is derived from the age of the path. It is important to note that old information is not deleted to enable history enrichment (i.e., the enrichment that was relevant at any time). Identity enrichment decision is done based on a certainty level of the identity information, which is derived from the data source type, e.g., Office 365® is a data source with high certainty, while network DNS information comes with a lower certainty (same goes to certainty levels that are based on the type of fuzzy identities rules that were used to identify common identities). Identity enrichment decision is done based on the required time frame, e.g., investigating an event that happened 20 days ago would require querying IDM data that was relevant 20 days before as well.

IDM (Identity management) proposes to allow managing connections between different identity properties such as username, account id, hostname, IP address, email address, email distribution list, and more. The purpose is to allow better investigation of user experience and better automatic attacks detections. The ability to enrich logs with additional identity properties allows the identification of broader correlations between events based on the same identity and even allows a security analyst to get more organizational context while analyzing XDR detection (for example the analyst can simply search for information about all identities associated with a user and thus clarify the organization structure). For example, two events with different IP addresses are usually not connected, but if you know that those addresses were used by the same host, it might be related to the same attack. In this case, enriching IP addresses with the host will enable the identification of events with different identity properties related to the same identity.

Organizations today use dozens of network, IT, and security solutions to support their organizations' operational and business needs. Every data source might include in its logs different properties that describe the asset involved. For example, email security tools would include the email address, and cloud workspace will include the account id or account name. While both the email address and the account id actually belong to the same person within the organization. Organizations with thousands of employees and dozens to hundreds of different systems are struggling with cross-data source investigation queries and therefore need a way to simplify the investigation and detect attacks while overcoming the difficulty in differences between identity properties. In some embodiments, these can be correlated using large language models, by the same or similar time stamps, using values, or using labeled data.

Users can include:
  SOC manager—responsible for implementation and management of security tools. Defines security analysts operational tasks and workflows and
  Security analyst—typically the first to respond to incidents. Responsible for threat detection, threat investigation, and timely response.
  Cybereason XDR researcher—responsible for continuously adding support multi-vector attack use cases, combining events received from diverse data sources and different entity types.

This can offer the ability to detect multi-vector attacks and correlate events reported with different entity properties related to the same user or host.

In some embodiments, a machine can be a computer, server, domain, mobile device, cloud instance, or other device connected to some network, either the organization's local or cloud network or external public network. A user identity can be a person within an organization. A user account can be a user identity might hold multiple user accounts of different types (domain, local, default). An email address can represent a mailbox. An app can include web applications that are used by organizational users (e.g., Jira, GitHub, SalesForce®, Facebook®). An asset can include any resources belonging to the organization such as users, hosts, domain, apps.

Figure 6:
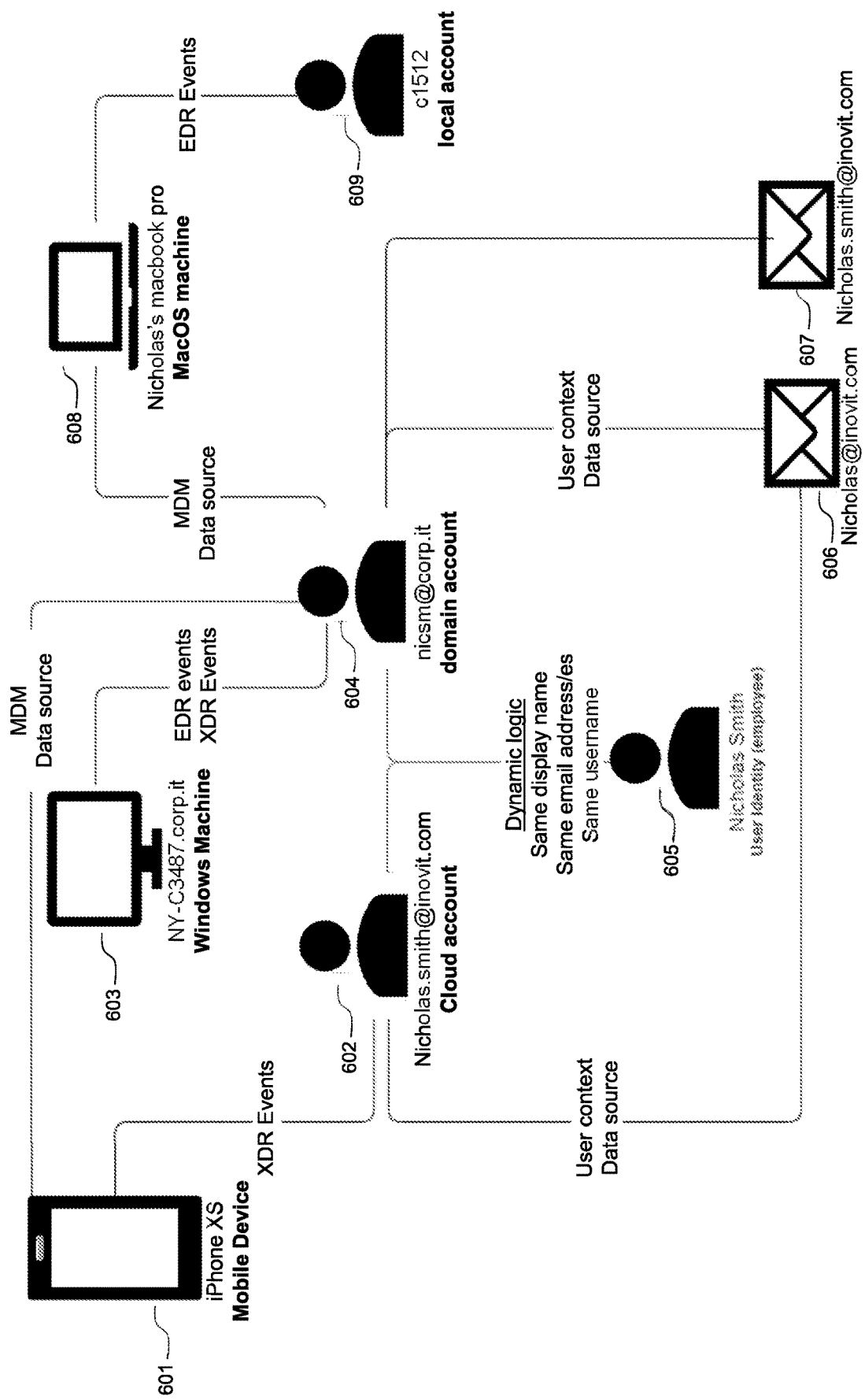
FIG. 6 shows an example user case of the disclosed IDM system according to some embodiments of the present disclosure.

FIG. 6 shows an example user case of the disclosed IDM system. The disclosed IDM can identify who the user account is that owns an email address, who the user account a given display name belongs to, who the user account a given username belongs to, who the user account a given employee number belongs to, which user accounts are members of a given group or email distribution list, which machine is using a given internal IP address at a specific point in time, or which machines a given user account was logged in to and when. In particular, FIG. 6 illustrates a user identity 605 (e.g., of an employee) Nicholas Smith who can dynamically login via a cloud account 602 or a domain account 604. The domain account 604 accesses two email accounts 606 and 607. The cloud account 602 can also access the email account 606. Both the cloud account 602 and the domain account 604 can be accessed via a mobile device 601. IN addition, the domain account 604 can be accessed by a machine 603 and a second machine 608. Finally, a local account 609 is used to access the second machine 608.

Figure 7A:
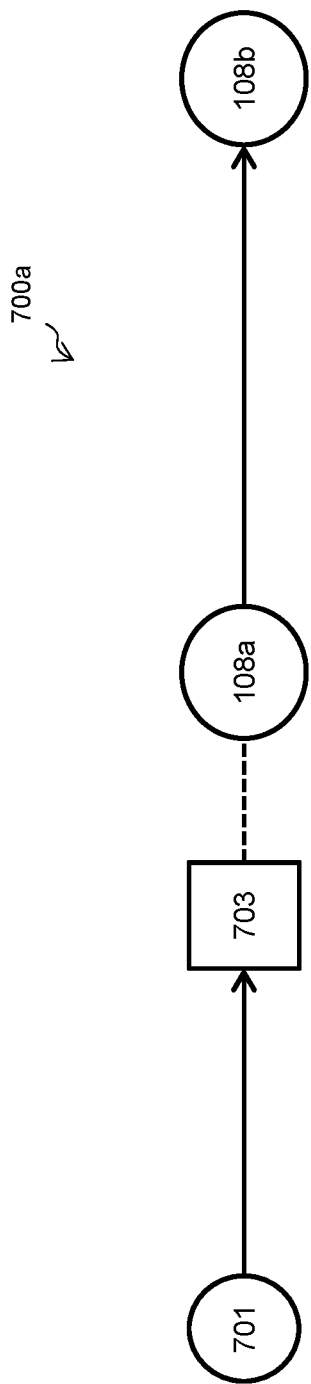
FIGS. 7A-7B show examples of possible correlations using the disclosed IDM system.
Figure 7B:
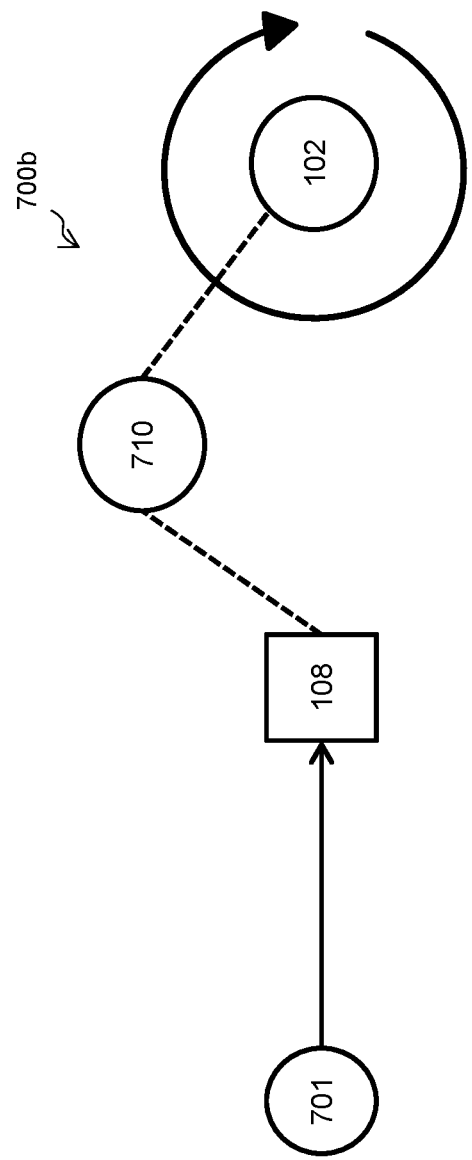

FIGS. 7A-7B show examples of possible correlations using the disclosed IDM system. FIG. 7A shows a possible correlation 700a. Correlation 700a includes a malicious sender 701 that has performed or attempted to perform spearphishing on an email group 703, which includes email address 108a. The email address 108a could have sent or forwarded the spearphishing attempt to a second email address 108b, furthering the correlation 700a. The disclosed principles allow for the correlation between these different entities, such as in a graphical representation.

FIG. 7B shows a possible correlation 700b. Correlation 700b includes a malicious sender 701 that has performed or attempted to perform spearphishing on an email address 108. The email address 108 is associated with a user identity 710 (e.g., an employee) who uses a device with a hostname 102 that executes various tasks. The disclosed principles allow for the correlation between these different entities, such as in a graphical representation.

Sources for learning user account details can include, Okta (more details), Microsoft Windows Active Directory, Microsoft Azure AD, Google Workspace, and XDR events. In the future, we might also enable customers to provide some structured file with the relevant information.

Properties of user account can include:
  provider
  account identifier
  username
  domain
  fqdn username
  display name
  email addresses
  employee number account type
status
username aliases
department
manager
phone
title
permissions
groups
roles Learning from XDR events can include the following process:
  Create new user account if the following are met—When getting an event with event.dataSource is one of (Google Workspace, Okta, Microsoft Azure, Office 365®) with at least user.accountProvider AND (user.username, user.domain OR user.adLogonName, user.adSid) and if the user does not already exist with similar properties according to the following order:
    1. user.adSid
    2. user.adLogonName+ user.accountProvider
    3. user.username+user.accountProvider
  Ingestion enrichment rules can apply to properties according to its type. If received property of type emailAddress and IDM know to which user account this address belongs to, then enrich emailAddress.users and emailAddress.isExternal=false ELSE emailAddress.isExternal=true Examples can include message.receipientAddresses→event.message.receipientAddresses.users
    4. event.message.senderAddress→event.message.senderAddress.users
  Rules for machine ingest user account to IDM user account can be ordered by priority:
    5. IF received user.adSid and IDM know to which user account this display name belongs to, then enrich user.username, user.domain, user.accountType, user.adDepartment, user.accountProvider, user.adTitle, user.identity
    6. IF received user.emailAddress and IDM know to which user account this email address belongs to, then enrich user.adLogonName, user.domain, user.accountType, user.adDepartment, user.accountProvider, user.adTitle, user.identity
    7. IF received user.username and IDM know to which user account this username belongs to, then enrich user.adLogonName, user.domain, user.accountType, user.adDepartment, user.accountProvider, user.adTitle, user.identity
    8. IF received property of user.displayName and user.accountProvider and IDM know to which user account this display name belongs to, then enrich user.adSid, user.username, user.domain, user.accountType, user.adDepartment, user.adTitle, user.identity Examples:
      event.sourceUser.displayName→event.sourceUser.username, . . .
      event.targetUser.displayName→event.targetUser.username, . . .

Figure 8:
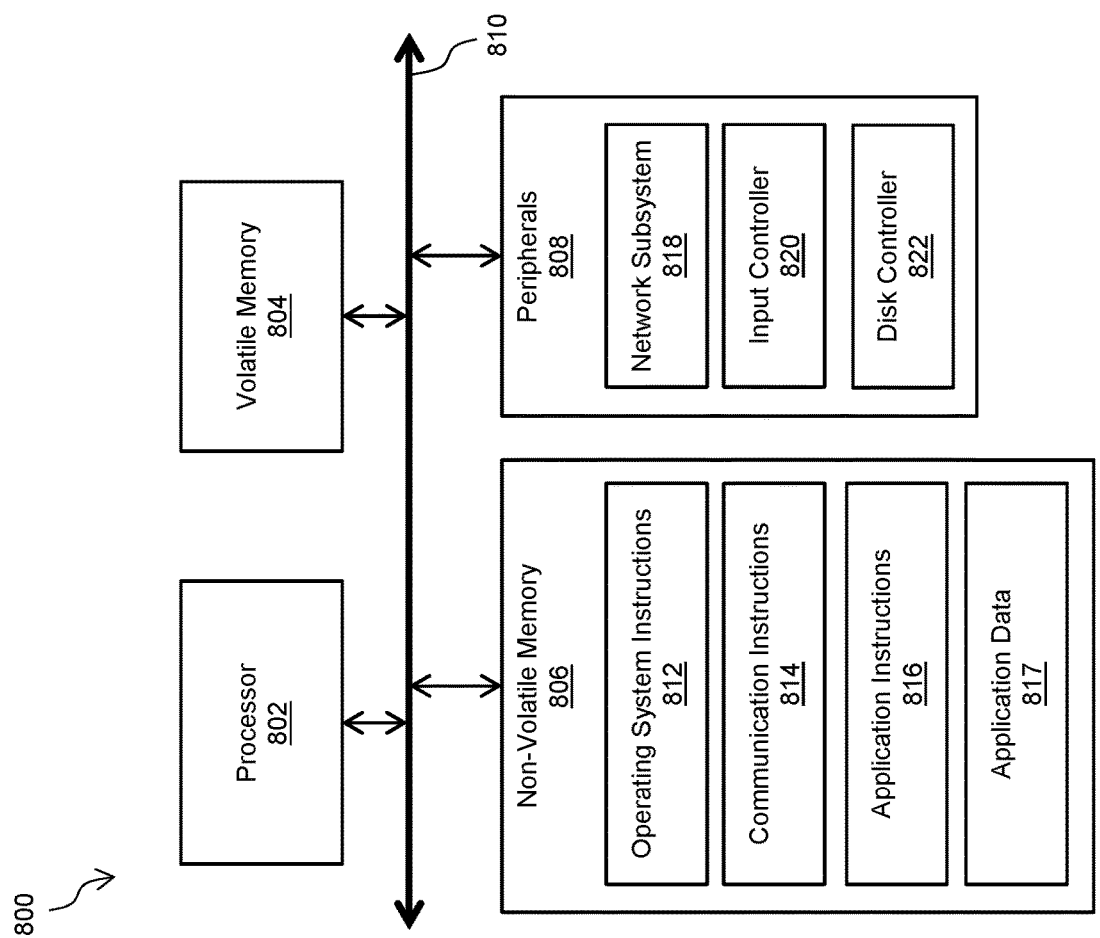
FIG. 8 is an example server device that can be used within the system of FIG. 1 according to an embodiment of the present disclosure.

Username aliases can include the following. The motivation for managing aliases for usernames is due to the fact that XDR received logs for various data sources that aren't always enforced with the same naming convention on the username. Therefore, events of the same user with different usernames might be received. Such as:

domain\username
username@domain
employee number@domain
Examples:
  1. If the FQDN is john.ohen@cybereson.co so user aliases might be one of the following:
     cybereason\john.cohen sivan.omer
     cybereason.co\john.cohen
     john.cohen
     johncohen
  2. If the employee ID is XXX so aliases might by one of the following:
     XXX@cybereason.com
  3. Other aliases might be the existence of one of the following properties:
     Account ID
     Display name
  4. It should be possible to add alias creation logic per tenant
     i. Email Address
1. Properties of email address:
   address
   address type
2. Principals:
   Email addresses that do not belong to the organizations might not be managed by the IDM.
   Any email addresses that belong to multiple accounts from the same provider can be considered as address type distribution.
2. Ingestion enrichment rules:
   IF received property of type emailAddress and IDM know this address then enrich emailAddress.isExternal=false and emailAddress.type with its value ELSE emailAddress.isExternal=true Email Address enrichment test cases (QA guide lines)
1. Use case: new account arrive through ingest pipeline that connected to existing identity
   1. Given IDM data from Okta with the following:
      1. user account details:
         1. adSid: 00ub0oNGTSWTBKOLGLCT
         2. username: zack.davidson
         3. domain: corp.net
         4. accountProvider: Okta
         5. accountType: Cloud
         6. email: zack.davidson@corp.com
         7. Title: Product Analyst
         8. DisplayName: Zack Davidson
      2. identity details:
         1. id: 1000000007
         2. aliases names: Zack Davidson, zack.davidson
   2. When getting the following log through the ingest pipeline
      1. username: zack.davidson
      2. domain: corp.com
      3. accountProvider: Google
      4. adSid: 1726374653245348756
   3. Then IDM shall enrich the log that it will contain the following data
      1. added for user identity:
         "identity": {"id":1000000007,"displayNames": ["Zack Davidson"] }
         ii. User Identity User Identity is an element managed by the Cybereason Identity management (IDM) service.
  1. Properties of user identity:
     unique identifier
     user accounts
     names 2. Principals:
   User accounts of the type domain or cloud (application) received in the system can be associated with some user identity.
   User accounts of type default may not belong to a user identity at all.
   When having two user accounts from the same account provider with the same display name means that those are two different persons that are sharing the same name. Therefore, for those accounts identity connection logic shall exclude rule 4.c below (similar display name)
2. Names of identity:
Names of user identity can be inferred from user account properties—User display name, User FQDN, User email addresses
3. Connecting user identity & user account
   Understanding who is the user identity can be according to the similarity of the names determined above and user account properties.
   Similar email address of type mailbox
   Similar username
   Similar display name
   Similar Logon name
4. Ingestion enrichment rules:
   IF received user and IDM know to which userIdentity it is connected then enrich user.identity with the userIdentity properties.
      iii. Machine
1. Sources for learning machine details are:
   1. XDR events
   2. EDR sensor
   3. Windows AD
   4. Microsoft Graph Azure MDM
   5. VMware Workspace ONE MDM
2. Properties of machine: WIP
   iv. User Identity< > Machine
1. Sources for that connection might be
   1. EDR sensor (in case there is on the machine)
   2. XDR Events
2. Learning from XDR events:
The following XDR events point that IP Address and machine are connected:
   1. VPN events—logic TBD
   2. Windows Security Auditing Succes events—logic TBD
   v. IP Address< > Machine
1. Sources for that connection might be
   1. EDR sensor (in case there is on the machine)
   2. XDR Events (firewall, DNS, DHCP)
   3. DNS server
2. Principals:
   1. This learning might apply only to internal IP Addresses. Learning shall be relative to the event-.time
3. Learning from XDR events:
   As IP Addresses can be used by different machines within a given period, we can often make the assumption that from the moment a machine was observed using a particular IP address it is valid as no other machine was observed using that same IP address.
   The following XDR events point that IP Address and machine are connected:
   1. TBD
4. Learning from DNS Server/s:
   1. DNS can return the current time machine using the address, therefore not relevant in some cases of getting the event in delay.
   2. In some embodiments we will attempt to limit massively querying the DNS
   3. DNS record of internal machine valid for X hours— while X configurable with default 6 hours.
   This is based on the assumption that the default DHCP lease time on most servers is 24 hours. When considering a busy network it will be less.
5. Ingestion enrichment rules:
   1. If connection.localAddress received, and IDM knows which machine is using this IpAddress THEN enrich connection.ownerMachine with the machine
   If connection.remoteAddress received and IDM knows which machine is using this IpAddress THEN enrich connection.remoteMachine with the machine FIG. 8 is a diagram of an example server device 800 that can be used within the disclosed systems. Server device 800 can implement various features and processes as described herein. Server device 800 can be implemented on any electronic device that runs software applications derived from complied instructions, including without limitation personal computers, servers, smart phones, media players, electronic tablets, game consoles, email devices, etc. In some implementations, server device 800 can include one or more processors 802, volatile memory 804, non-volatile memory 808, and one or more peripherals 808. These components can be interconnected by one or more computer buses 810.

Processor(s) 802 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 810 can be any known internal or external bus technology, including but not limited to ISA, EISA, PCI, PCI Express, USB, Serial ATA, or FireWire. Volatile memory 804 can include, for example, SDRAM. Processor 802 can receive instructions and data from a read-only memory or a random access memory or both. Essential elements of a computer can include a processor for executing instructions and one or more memories for storing instructions and data.

Non-volatile memory 806 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 806 can store various computer instructions including operating system instructions 812, communication instructions 814, application instructions 816, and application data 817. Operating system instructions 812 can include instructions for implementing an operating system (e.g., Mac OS®, Windows®, or Linux). The operating system can be multi-user, multiprocessing, multitasking, multithreading, real-time, and the like. Communication instructions 814 can include network communications instructions, for example, software for implementing communication protocols, such as TCP/IP, HTTP, Ethernet, telephony, etc. Application instructions 816 can include instructions for various applications. Application data 817 can include data corresponding to the applications.

Peripherals 808 can be included within server device 800 or operatively coupled to communicate with server device

800. Peripherals 808 can include, for example, network subsystem 818, input controller 820, and disk controller 822. Network subsystem 818 can include, for example, an Ethernet of WiFi adapter. Input controller 820 can be any known input device technology, including but not limited to a keyboard (including a virtual keyboard), mouse, track ball, and touch-sensitive pad or display. Disk controller 822 can include one or more mass storage devices for storing data files; such devices include magnetic disks, such as internal hard disks and removable disks; magneto-optical disks; and optical disks.

Figure 9:
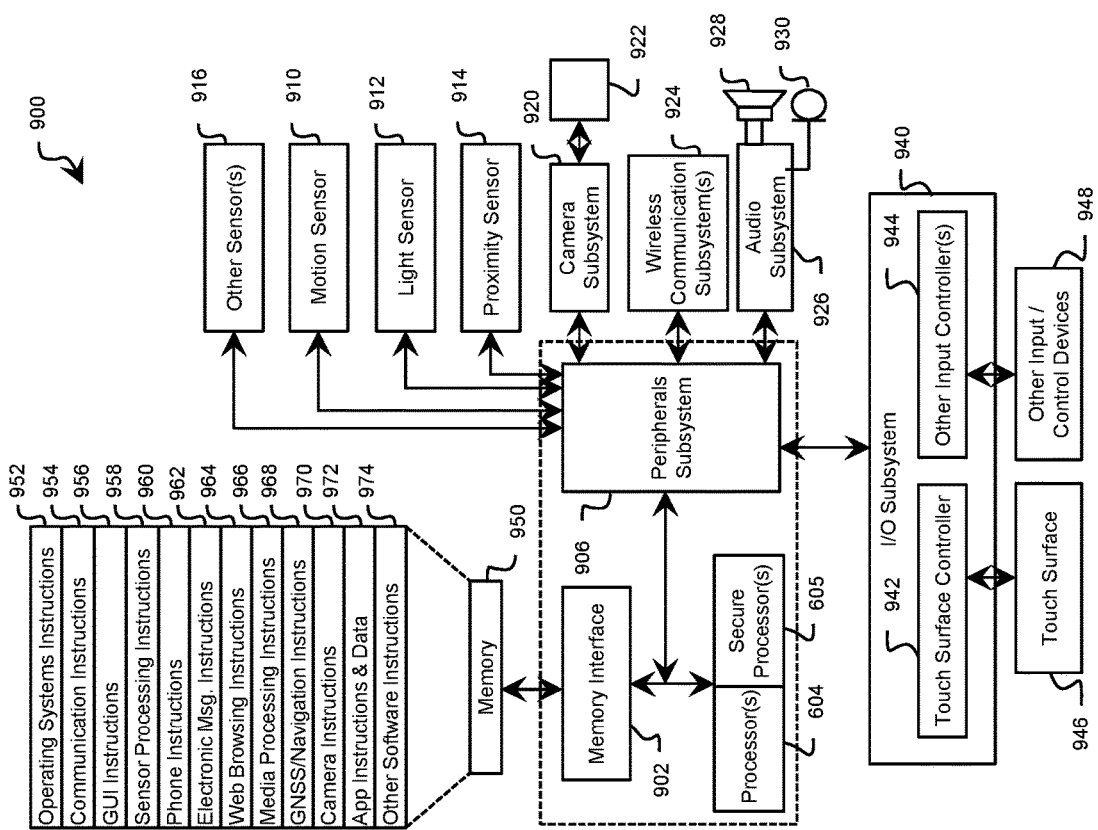
FIG. 9 is an example computing device that can be used within the system of FIG. 1 according to an embodiment of the present disclosure.

FIG. 9 is an example computing device that can be used within the disclosed systems, according to an embodiment of the present disclosure. The illustrative user device 900 can include a memory interface 902, one or more data processors, image processors, central processing units 904, and/or secure processing units 905, and peripherals subsystem 906. Memory interface 902, one or more central processing units 904 and/or secure processing units 905, and/or peripherals subsystem 906 can be separate components or can be integrated in one or more integrated circuits. The various components in user device 900 can be coupled by one or more communication buses or signal lines.

Sensors, devices, and subsystems can be coupled to peripherals subsystem 906 to facilitate multiple functionalities. For example, motion sensor 910, light sensor 912, and proximity sensor 914 can be coupled to peripherals subsystem 906 to facilitate orientation, lighting, and proximity functions. Other sensors 916 can also be connected to peripherals subsystem 906, such as a global navigation satellite system (GNSS) (e.g., GPS receiver), a temperature sensor, a biometric sensor, magnetometer, or other sensing device, to facilitate related functionalities.

Camera subsystem 920 and optical sensor 922, e.g., a charged coupled device (CCD) or a complementary metal-oxide semiconductor (CMOS) optical sensor, can be utilized to facilitate camera functions, such as recording photographs and video clips. Camera subsystem 920 and optical sensor 922 can be used to collect images of a user to be used during authentication of a user, e.g., by performing facial recognition analysis.

Communication functions can be facilitated through one or more wired and/or wireless communication subsystems 924, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 924. The specific design and implementation of communication subsystems 924 can depend on the communication network(s) over which the user device 900 is intended to operate. For example, user device 900 can include communication subsystems 924 designed to operate over a GSM network, a GPRS network, an EDGE network, a WiFi or WiMax network, and a Bluetooth™ network. For example, wireless communication subsystems 924 can include hosting protocols such that device 900 can be configured as a base station for other wireless devices and/or to provide a WiFi service.

Audio subsystem 926 can be coupled to speaker 928 and microphone 930 to facilitate voice-enabled functions, such as speaker recognition, voice replication, digital recording, and telephony functions. Audio subsystem 926 can be configured to facilitate processing voice commands, voiceprinting, and voice authentication, for example.

I/O subsystem 940 can include a touch-surface controller 942 and/or other input controller(s) 944. Touch-surface controller 942 can be coupled to a touch-surface 946. Touch-surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In some implementations, a pressing of the button for a first duration can disengage a lock of touch-surface 946; and a pressing of the button for a second duration that is longer than the first duration can turn power to user device 900 on or off. Pressing the button for a third duration can activate a voice control, or voice command, module that enables the user to speak commands into microphone 930 to cause the device to execute the spoken command. The user can customize a functionality of one or more of the buttons. Touch-surface 946 can, for example, also be used to implement virtual or soft buttons and/or a keyboard.

In some implementations, user device 900 can present recorded audio and/or video files, such as MP3, AAC, and MPEG files. In some implementations, user device 900 can include the functionality of an MP3 player, such as an iPod™. User device 900 can, therefore, include a 36-pin connector and/or 8-pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store an operating system 952, such as Darwin, RTXC, LINUX, UNIX, OS X, Windows, or an embedded operating system such as VxWorks.

Operating system 952 can include instructions for handling basic system services and for performing hardware dependent tasks. In some implementations, operating system 952 can be a kernel (e.g., UNIX kernel). In some implementations, operating system 952 can include instructions for performing voice authentication.

Memory 950 can also store communication instructions 954 to facilitate communicating with one or more additional devices, one or more computers and/or one or more servers.

Memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic messaging-related process and functions; web browsing instructions 964 to facilitate web browsing-related processes and functions; media processing instructions 966 to facilitate media processing-related functions and processes; GNSS/Navigation instructions 968 to facilitate GNSS and navigation-related processes and instructions; and/or camera instructions 970 to facilitate camera-related processes and functions.

Memory 950 can store application (or "app") instructions and data 972, such as instructions for the apps described above in the context of FIGS. 2-7. Memory 950 can also store other software instructions 974 for various other software applications in place on device 900.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

The invention claimed is:

1. A computer-implemented method for correlating user information comprising:
receiving, from a user device, a login log associated with a user;
receiving an intrusion detection system (IDS) log;
receiving a domain name system (DNS) log;
receiving, from a computing device, an application log;
enriching at least one of the login log, the IDS log, or the DNS log, wherein enriching at least one of the login log, the IDS log, or the DNS log comprises enriching the application log with a hostname associated with the DNS log, a first IP address associated with the IDS log, and a second IP address associated with the DNS log;
correlating an identity with one or more of the login log, the IDS log, and the DNS log; and
executing a response action via at least one of a network device, an identity management system, an email system, or a cloud workspace application to address a detected threat associated with the correlated identity.

2. The computer-implemented method of claim 1, wherein correlating the identity with one or more of the login log, the IDS log, and the DNS log comprises generating a graph representation and saving the graph representation as a sparse graph representation.

3. The computer-implemented method of claim 2, wherein receiving the login log comprises receiving at least one of a username and an internet protocol (IP) address.

4. The computer-implemented method of claim 3, wherein receiving the IDS log comprises receiving at least one of an IP address and the hostname.

5. The computer-implemented method of claim 4, wherein the IP address is the first IP address and receiving the DNS log comprises receiving the hostname and the second IP address.

6. The computer-implemented method of claim 5, wherein receiving the log comprises receiving at least one of an email address and the username.

7. The computer-implemented method of claim 6, wherein enriching at least one of the login log, the IDS log, or the DNS log comprises enriching the IDS log with the username.

8. The computer-implemented method of claim 5, wherein the graph representation comprises a plurality of nodes, wherein each node is associated with one of the identity, the first IP address, the second IP address, the username, the hostname, and the email address.

9. The computer-implemented method of claim 1 comprising:
receiving at least one of keystroke information, ad analysis information, and browser fingerprinting information; and
correlating the at least one of keystroke information, ad analysis information, and browser fingerprinting information with the identity.

10. A computer-implemented method for correlating user information comprising:
receiving, from a user device, a login log associated with a user;
receiving an intrusion detection system (IDS) log;
receiving a domain name system (DNS) log;
receiving, from the user device, an application log;
enriching at least one of the login log, the IDS log, or the DNS log, wherein enriching at least one of the login log, the IDS log, or the DNS log comprises enriching the application log with a hostname associated with the DNS log, a first IP address associated with the IDS log, and a second IP address associated with the DNS log;
receiving a second DNS log;
correlating an identity with one or more of the login log, the IDS log, and the DNS log; and
executing a response action via at least one of a network device, an identity management system, an email system, or a cloud workspace application to address a detected threat associated with the correlated identity.

11. The computer-implemented method of claim 10, wherein correlating the identity with one or more of the login log, the IDS log, and the DNS log comprises generating a graph representation and saving the graph representation as a sparse graph representation.

12. The computer-implemented method of claim 10, wherein receiving the login log comprises receiving at least one of a username and an internet protocol (IP) address.

13. The computer-implemented method of claim 12, wherein receiving the IDS log comprises receiving at least one of an IP address and the hostname.

14. The computer-implemented method of claim 13, wherein the IP address is the first IP address and receiving the DNS log comprises receiving the hostname and the second IP address.

15. The computer-implemented method of claim 14, wherein receiving the application log comprises receiving at least one of an email address and the username.

16. The computer-implemented method of claim 15, wherein enriching at least one of the login log, the IDS log, or the DNS log comprises enriching the IDS log with the username.

17. The computer-implemented method of claim 14, wherein receiving the second DNS log comprises receiving a second hostname and the second IP address.

18. The computer-implemented method of claim 10 comprising:
receiving at least one of keystroke information, ad analysis information, and browser fingerprinting information; and
correlating the at least one of keystroke information, ad analysis information, and browser fingerprinting information with the identity.

* * * * *